Dec. 22, 1931.  E. R. WHARTON  1,837,804
VALVE STRUCTURE
Filed Jan. 2, 1931  3 Sheets-Sheet 1
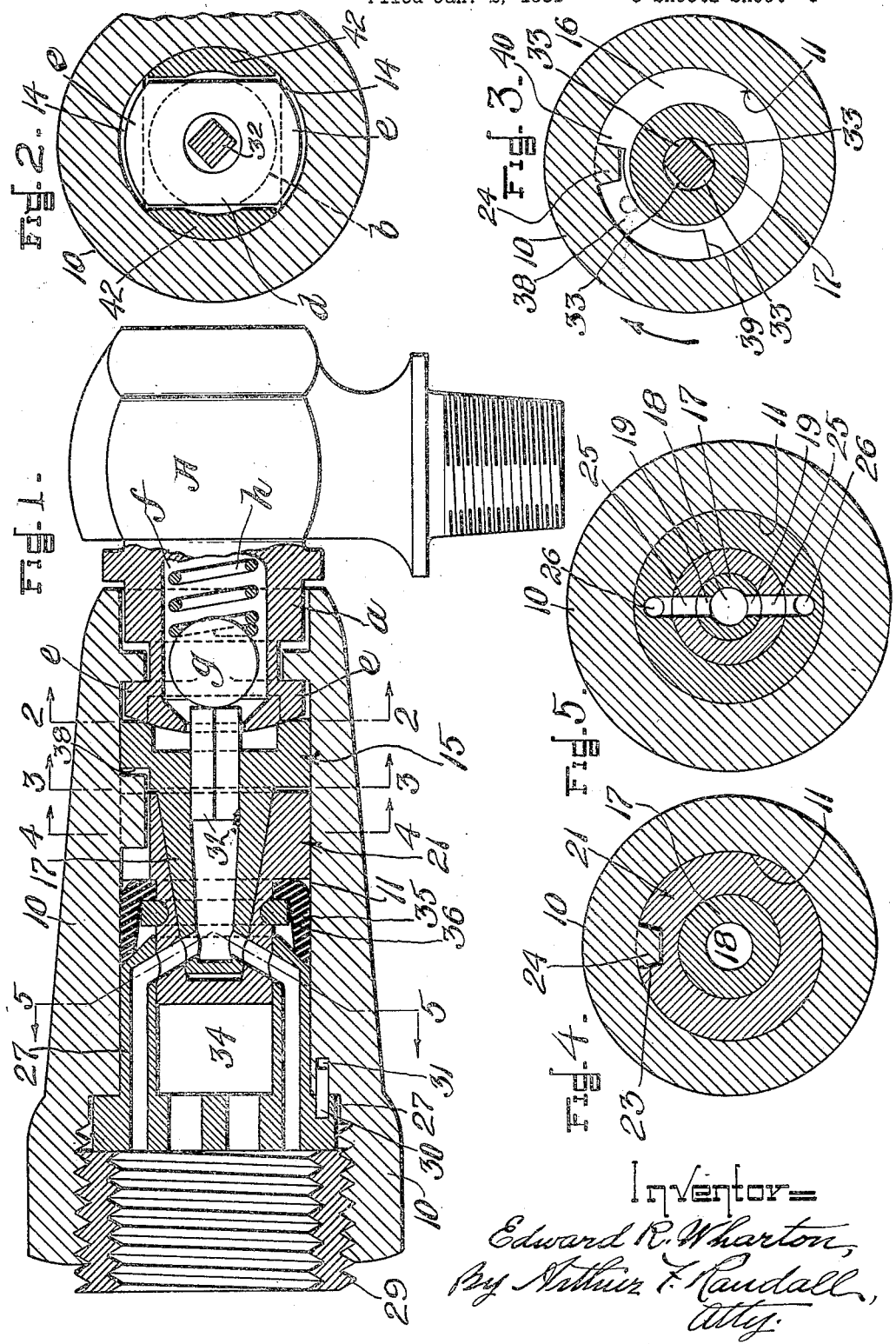
Inventor=
Edward R. Wharton,
By Arthur F. Randall,
Atty.

Dec. 22, 1931.  E. R. WHARTON  1,837,804
VALVE STRUCTURE
Filed Jan. 2, 1931    3 Sheets-Sheet 2
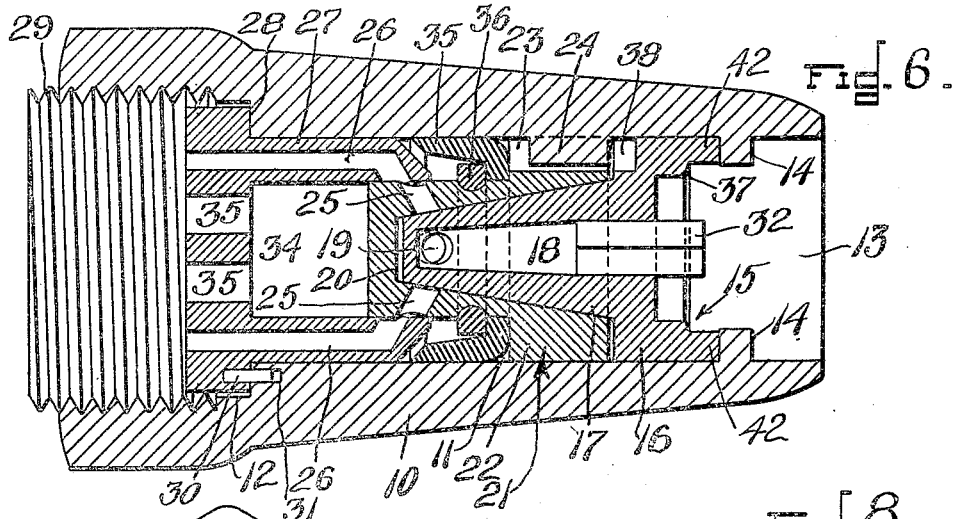
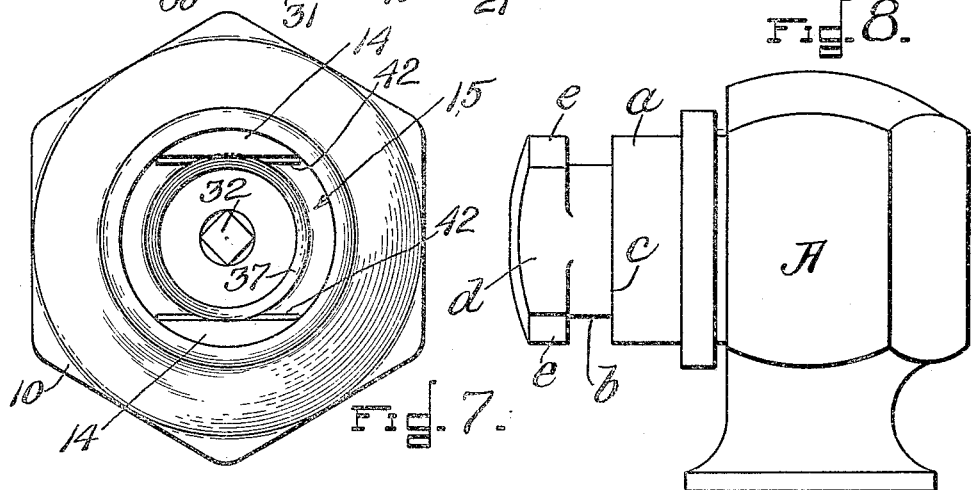
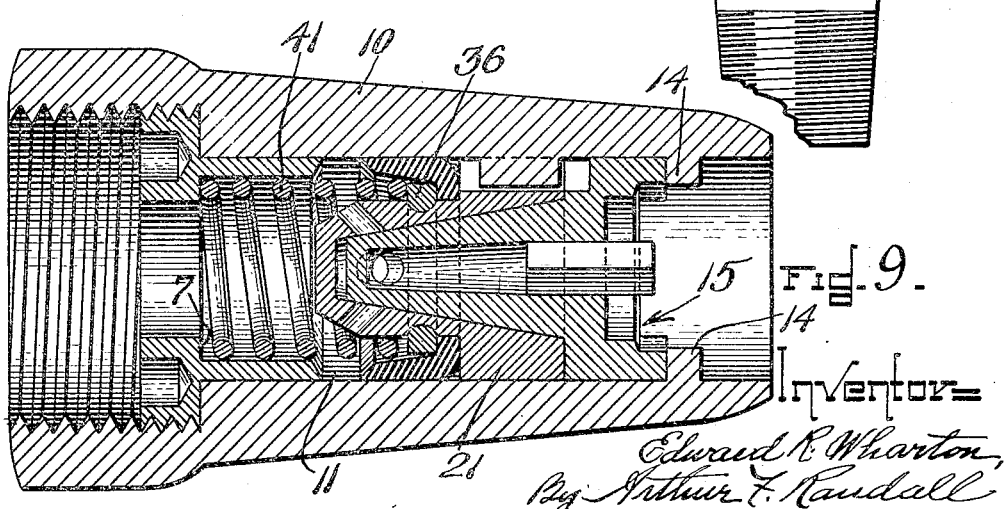
Inventor
Edward R. Wharton
By Arthur F. Randall
Atty.

Patented Dec. 22, 1931

1,837,804

UNITED STATES PATENT OFFICE

EDWARD R. WHARTON, OF MEDFORD, MASSACHUSETTS

VALVE STRUCTURE

Application filed January 2, 1931. Serial No. 507,202.

My invention relates to valve structures but more especially to valve structures such as are incorporated in the delivery nozzles of grease guns and the like, and it has for its object to improve the construction of valve structures of this class.

Grease guns and the like have heretofore been provided with a delivery nozzle whose outlet end portion was adapted to be slid telescopically on to a nipple forming part of a ported receiving fixture after which the nozzle was partially rotated on the nipple to interlock the two devices so that they would be held coupled together while operating the grease gun to deliver grease or the like into the receiving fixture. It has been common to construct the nozzle with a normally closed valve which was automatically opened by the nipple when the nozzle was slid endwise on to the same, said valve being normally held closed by a spring which was the sole means depended upon for closing said valve while the nozzle was being removed endwise from the nipple at the conclusion of the operation of the gun. This prior construction and mode of operation had the objection that in the absence of the spring referred to the pressure of the material within the gun would not, or could not be relied upon to, close the valve or close it quickly enough, so that a spring element to perform this function was essential and therefore breakage or deformation of said spring through use would render the nozzle useless; that the use of said spring was an item of cost in the manufacture of said nozzles which it was desirable to avoid, and that the valve was opened before the nipple of the fixture was fully within the nozzle and before it was fully seated with the maximum pressure against the mouth of the port through which the grease or the like was delivered from the nozzle into the nipple, said port extending through the stem of the valve which was moved endwise against the pressure of said spring relatively to the body or housing of the nozzle to open the valve by endwise engagement of said stem with the end of the nipple as the nozzle was slid on to the latter.

My invention provides a simple, inexpensive and efficient valve structure that is particularly adapted to be incorporated in nozzles of the class referred to and wherein the valve is opened by the rotary movement of the body or housing thereof on the nipple of the receiving fixture after said nipple is fully within the delivery end of said body or housing, said rotary movement operating at the same time to interlock said body or housing with said nipple so that it is held in place thereon during the delivery operation.

Another feature of my invention consists in constructing the valve mechanism so as to utilize the pressure of the material within the inlet end of the body or housing to hold the parts of the valve mechanism in co-operative engagement and relationship, and also to hold the valve structure firmly against the end of the nipple of the receiving fixture during the delivery operation so that in the preferred form of my invention, the spring that heretofore has been essential may be dispensed with.

Other features of my invention are hereinafter pointed out.

In the accompanying drawings:

Figure 1 is a central longitudinal sectional view of a delivery nozzle constructed in accordance with this invention, said nozzle being shown as applied to a complementary receiving fixture of ordinary construction, and the latter being shown partly in section.

Figure 2 is a section on line 2—2 of Fig. 1.
Figure 3 is a section on line 3—3 of Fig. 1.
Figure 4 is a section on line 4—4 of Fig. 1.
Figure 5 is a section on line 5—5 of Fig. 1.
Figure 6 is a central longitudinal sectional view of the delivery nozzle shown in Fig. 1 with the valve mechanism thereof in its closed condition.

Figure 7 is an end elevation of the nozzle shown in Fig. 6.

Figure 8 is a side elevation of the receiving fixture.

Figure 9 is a sectional view illustrating a second form of my invention.

Figure 10:
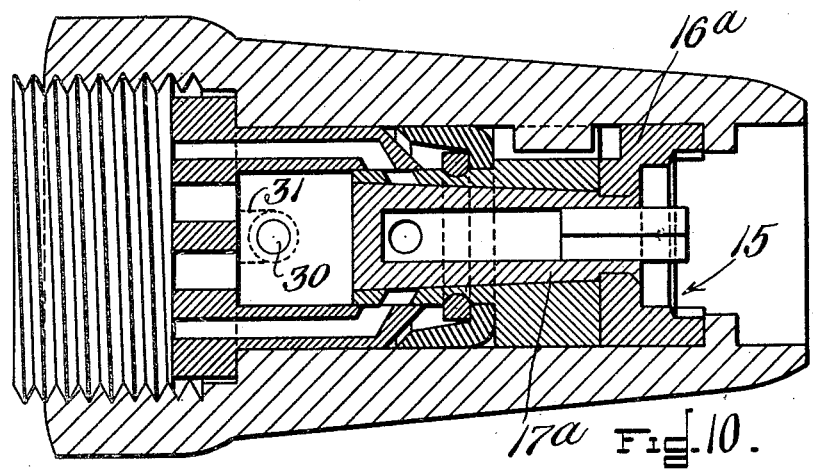
Figures 10 and 11 illustrate further modifications.

All of the forms of my invention are herein illustrated as embodied in delivery nozzles for grease guns and the like but it is to be understood that the utility of this invention is not limited to this particular class of structure or unit.

The embodiment of this invention illustrated in Figs. 1 to 7, inclusive, comprises a body or housing member 10 that is formed interiorly with a bore or chamber 11 extending from end to end thereof and which, in most part, is approximately cylindrical.

One end portion 12 of this chamber, Fig. 6, is hereinafter referred to as the inlet end portion and the opposite end portion 13 is hereinafter referred to as the outlet end portion.

Within the outlet end portion 13 of the chamber 11 the housing member 10 is formed with a pair of integral segmental lugs 14, one at each side of chamber 11, having straight, relatively parallel, chord-like inner edges, Figs. 6 and 7, which are spaced apart to provide between them a passageway for the end portion of the nipple a of a receiving fixture A (Fig. 8), of usual construction, which is ordinarily permanently attached to a bearing or the like.

The nipple a is formed with a neck b at the inner end of which is provided an annular shoulder c and at the outer end of which is provided a head d including as parts thereof two radial lugs e disposed diametrically opposite each other as shown in Fig. 2.

The diameter of the neck b is slightly less than the passageway between the lugs 14 of the housing member 10; the lugs e are about the same in width as the diameter of said neck, and the distance from end to end of lugs e, as well as the diameter of nipple a, are slightly less than the diameter of the outlet end portion 13 of chamber 11.

Therefore, it is possible to slide the outlet end of housing member 10 telescopically on to the nipple a with the lugs e held in positions to pass between and beyond the lugs 14 after which rotary movement of housing member 10 on the nipple a to the extent of ninety degrees in a right hand direction places the lugs e behind the lugs 14 thereby interlocking the housing member and nipple so that they are held or locked coupled together as shown in Fig. 1.

The fixture A is made with a port or conduit f whose inlet end is at the center of head d and controlled by an outwardly closing spring-pressed ball check valve g.

Within the chamber 11 behind the lugs 14 is provided a rotatable and axially movable valve member that is indicated generally by the reference numeral 15, and which comprises an approximately cylindrical body 16 provided upon its inner face with a longitudinally extending valve plug 17 which tapers toward its inner end.

The plug 17 is made with a longitudinal centrally disposed port 18, Figs. 5 and 6, which communicates at its inner end with two more or less radial branch ports 19 which are arranged diametrically opposite each other as shown in Figs. 1 and 5.

The valve plug 17 is mounted and seated within a conical socket 20 provided within a valve-seat member that is indicated generally at 21, said valve-seat member comprising an approximately cylindrical body portion 22 that is slidably mounted within the chamber 11 immediately behind the body 16 of the valve member 15. The body 22 of the valve-seat member 21 is formed at its periphery with a longitudinal groove 23 that is occupied by a spline 24 that is an integral part of the housing member 10. It will therefore be clear that the valve-seat member 21 is free to slide longitudinally with respect to the housing member 10 but is keyed to the same so that it is rotated by and with said housing member when the latter is rotated while applying it to or removing it from the nipple a.

Near its inner end the conical socket 20 communicates with a pair of more or less radially disposed ports 25 in valve-seat member 21 whose outer ends co-operate with the inner ends of a pair of ports 26 formed through a plug 27 removably mounted within the inlet end portion of the chamber 11 between a shoulder 28 on the housing member 10 and an interiorly and exteriorly threaded sleeve or bushing 29 that is screwed into the interiorly threaded portion of the inlet end of the chamber 11. A pin 30 occupying a hole 31 provided upon the interior of the housing member 10 serves to position the plug 27 angularly with its ports 26 occupying co-operative relationship with the ports 25.

The threaded sleeve 29 is screwed on to the usual exteriorly threaded outlet nipple (not shown) of the cylinder of the grease gun or the like so that when the ports of the nozzle occupy the positions shown in Fig. 1 and the grease gun or the like is operated to discharge material therefrom into the inlet end of the nozzle, said material is forced under pressure through the ports 26, 25, 19 and 18 into the port f of the receiving fixture A.

Into the outlet end portion of the port 18 is driven a pin or plug 32 whose outer end is projected into the inlet end of port f when the nozzle is slid telescopically on to the nipple and thereby operates to positively open the check valve g against the pressure of its spring h and to hold said check valve open while the nozzle remains in position upon the nipple as in Fig. 1.

The pin or plug 32 is square in cross section and therefore when it is driven into the delivery end of port 18 as described four passageways or conduits 33, Fig. 3, exist around said pin or plug through which the material is delivered into port f as described.

The rear or inner end portion of the valve-seat member 21 is made approximately cylindrical and is telescopically fitted within a chamber 34 provided in the plug 27, said chamber communicating with the interior of the threaded sleeve 29 through ports 35.

From the above description it will be seen that a distinguishing feature of the embodiment of my invention illustrated in Figs. 1 to 7, inclusive, is that the valve member is coupled to the head $d$ of the nipple $a$ when the housing member 10 is slid endwise on to said nipple so that when said housing member is thereafter turned in a right hand direction on the axis of the nipple to lock the two together, the said valve member is held by the nipple against rotating with the housing member by the engagement of head $d$ with lugs 42 on valve member 15, while the valve-seat member 21 is compelled by the spline 24 to rotate with the housing member 10 relatively to the valve member 15 thereby adjusting the valve mechanism into its open condition.

Another distinguishing feature of the construction so far described is that the pressure of the material that is forced through the ports 35 and into the chamber 34 acts against the inner end of the valve-seat member 21 to hold the latter in co-operative engagement with the valve plug 17 and this pressure performs this function not only while material is being delivered to the receiving fixture A but after removal of the nozzle from the nipple $a$.

In order to prevent leakage of material through the joint between the body 22 of valve-seat member 21 and the housing member 10, I provide a packing ring 35, which may be made of leather or any other suitable material, and which is held in position against the inner side of said body portion 22 by means of a split ring 36 that is sprung into an annular groove provided upon the exterior of the inner cylindrical portion of said valve-seat member.

The parts of the valve mechanism are so positioned normally that when the housing member 10 is slid on to the nipple $a$ and the head $d$ of the latter passes through the passageway between the lugs 14, the end surface of the nipple $a$ which surrounds the inlet end of port $f$ and which is of spherical form, is brought into abutting engagement with an annular seat 37 provided upon the outer side of the body 16 of the valve member 15 around the delivery end of the passageways 33. Continued movement of the housing member 10 endwise on to the nipple carries one end portion of the spline 24 into a recess 38 provided upon the inner face or side of the body 16 of valve member 15. See Figs. 3 and 6. This recess 38 is formed in the periphery of the body 16 and provided at its opposite ends with shoulders 39 and 40 to co-operate with the spline 24. The recess 38 is arcuate and ninety degrees in length. That is, through engagement of the shoulders 39 and 40 with the spline 24 the possible angular relative movement between the housing member 10 and the body 16 of the valve member is limited to ninety degrees.

When the housing member 10 is slid endwise on to the nipple $a$ and the end of the spline 24 is moved into the recess 38 it occupies a position close to the shoulder 39, Fig. 3. At this time the valve plug 17 occupies closed position with respect to the valve-seat member 21. After shoving the housing member 10 endwise completely on to the nipple $a$, said housing member is, as stated above, rotated in a right hand direction, as indicated by the arrow in Fig. 3, while the nipple $a$ holds the valve member 15 against rotating with said body member. It will therefore be clear that when the housing member 10 has been thus turned to the extent of ninety degrees the spline 24 is brought into position against the shoulder 40 which prevents further movement of the housing member in that direction and leaves the parts in a condition where the lugs $e$ are behind the lugs 14 of the housing member so that the latter is locked in position upon the nipple.

In Fig. 9 the ports 25 of the valve-seat member 21 communicate directly with the inlet portion of the chamber 11 of the housing member 10 and a coiled spring 41 is provided within the inlet portion of said chamber which bears at one end against the split ring 36 and at its opposite end against a shoulder 7. This spring 41 is provided so that when the valve and valve-seat members are displaced inwardly relatively to the housing member 10, said spring is compressed and its pressure acts through the split ring 36, valve-seat member 21 and valve member 15 to clamp the lugs $e$ of the nipple firmly between the valve member 15 and the lugs 14 of housing member 10. Thus the spring 41 is provided mainly to assist in holding the housing member 10 securely in position on the nipple $a$ while a delivery operation is being carried out. It may, however, also assist the pressure of the material to hold or maintain the valve and valve-seat members 15 and 21 in normal co-operative engagement.

In Fig. 10 I have shown a construction wherein the valve member 15 is provided with a valve plug 17$a$ that is tapered oppositely to that of plug 17 of Figs. 1 and 6 and in order to assemble the parts of the valve mechanism illustrated in Fig. 10 the plug 17$a$ may be an originally separate piece fastened at its outer end in any suitable fashion to the body portion 16$a$ of the valve member.

Figure 11:
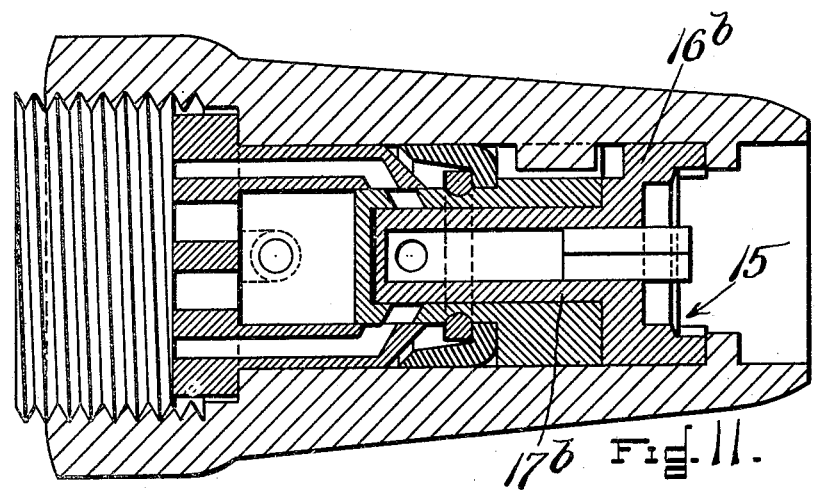

In Fig. 11 the valve plug 17$b$ is made exteriorly cylindrical and preferably as an integral part of the body portion 16$b$ of the valve member 15.

The lugs 42 upon the outer face of valve member 15, Figs. 1 and 2, are disposed diametrically opposite each other and spaced apart a distance that is slightly greater than the width of head d of the nipple a and when the valve mechanism is in its closed condition said lugs 42 are directly behind the lugs 14 of the housing member. Therefore, when the housing member 10 is slid on to the nipple and the latter engages the annular seat 37, Fig. 7, the head d of the nipple occupies a position between said lugs 42 thereby locking the valve member 15 against rotation in either direction with the housing member 10.

What I claim is:—

1. A valve structure for controlling the delivery of a fluid under pressure comprising a tubular housing member having inlet and outlet end portions, said outlet end portion being adapted to be slid telescopically on to the nipple of a receiving fixture and then rotated to interlock said housing member with said nipple; a valve member mounted within said housing member so that said housing member is movable endwise and rotatively with relation thereto; means for interlocking said valve member with the nipple of the receiving fixture when said housing member is slid on to the latter so that when said housing member is thereafter rotated said valve member is held stationary by said nipple; a valve-seat member movably mounted within said housing member; and means for rotating said valve-seat member with said housing member thereby to open and close said valve mechanism while said housing member is in position upon the nipple of the receiving fixture, said valve and valve-seat members being urged toward the outlet end of said housing member by the pressure of the fluid within the inlet end portion thereof thereby to hold said valve member against the end of the nipple of the receiving fixture during the delivery operation.

2. A valve structure constructed in accordance with claim 1 wherein a spline is provided within said housing member that occupies a longitudinal groove provided upon the exterior of said valve-seat member to prevent relative rotary movement of said members and at the same time permit of axial movement of said valve-seat member relatively to said housing member.

3. A valve structure constructed in accordance with claim 1 wherein a spline is provided within said housing member that occupies a longitudinal groove provided upon the exterior of said valve-seat member to prevent relative rotary movement of said members and at the same time permit of axial movement of said valve-seat member relatively to said housing member, and wherein said spline serves as a stop to limit the relative rotary movement of said valve and valve-seat members.

4. A valve structure constructed in accordance with claim 1 wherein a spline is provided within said housing member that occupies a longitudinal groove provided upon the exterior of said valve-seat member to prevent relative rotary movement of said members and at the same time permit of axial movement of said housing member relatively to said valve-seat member, said spline co-operating with a shoulder on said valve member thereby to limit the relative rotary movement of said valve and valve-seat members.

5. A valve structure constructed in accordance with claim 1 and including a packing ring mounted upon the exterior of said valve-seat member and slidably engaging the interior of said housing member thereby to prevent leakage of material through the joint between said valve-seat member and housing member.

6. A valve structure constructed in accordance with claim 1 and including means provided at the outer end of said valve member to engage and open the valve of a receiving fixture of the character described when said housing member is slid telescopically into position upon the nipple thereof.

7. A valve structure constructed in accordance with claim 1 wherein a spring is provided within the inlet end portion of said housing member which yieldingly opposes movement of said valve and valve-seat members toward said inlet end.

8. A valve structure constructed in accordance with claim 1 wherein a spring is provided within the inlet end portion of said housing member which yieldingly opposes movement of said valve and valve-seat members toward said inlet end and wherein an abutment member is mounted within said inlet end portion against which one end of said spring abuts.

9. A valve structure comprising a housing member formed interiorly with a chamber having inlet and outlet end portions and having means within said outlet end portion for holding engagement with the nipple of a receiving fixture when said outlet end portion is slid telescopically on to said nipple and thereafter partially rotated; a ported valve member supported within said chamber adjacent said outlet end portion so as to be movable therein rotatively and axially and constructed at its outer end to fit against the end of said nipple around the inlet thereof and to also interlock with said nipple so that it is held by the latter against rotating with the housing member when said member is rotated to lock it to or free it from said nipple; a ported valve-seat member supported within said chamber behind said ported valve member so that it is movable axially with respect to said housing member but is rotated by and with the latter, said valve-seat member being held in co-operative engagement with said valve member by the pressure thereon of the material within the inlet end portion of said chamber; means on said housing member to limit the axial movement of said valve and valve-seat members toward said outlet end portion under the influence of said pressure, and stop means for limiting the rotary interlocking movement of said housing and valve-seat members relatively to said receiving fixture and said valve member so that at the conclusion of said movement the ports of said valve and valve-seat members are in register.

Signed by me at Boston, Suffolk County, Massachusetts, this 17th day of December, 1930.

EDWARD R. WHARTON.